United States Patent
Jäger et al.

(10) Patent No.: US 7,337,879 B2
(45) Date of Patent: Mar. 4, 2008

(54) METHOD AND TOOL FOR THE MACHINING OF WORKPIECES WITH COOLING

(75) Inventors: Walter Jäger, Hilter (DE); Alexander Stoll, Plymouth, MI (US)

(73) Assignees: Ford-Werke GmbH, Cologne (DE); Multimatic International GmbH, Hilter (DE)

( * ) Notice: Subject to any disclaimer, the term of this patent is extended or adjusted under 35 U.S.C. 154(b) by 643 days.

(21) Appl. No.: 10/485,994

(22) PCT Filed: Aug. 16, 2002

(86) PCT No.: PCT/DE02/03021

§ 371 (c)(1),
(2), (4) Date: Feb. 5, 2004

(87) PCT Pub. No.: WO03/026843

PCT Pub. Date: Apr. 3, 2003

(65) Prior Publication Data

US 2004/0234350 A1 Nov. 25, 2004

(30) Foreign Application Priority Data

Aug. 27, 2001 (DE) .................. 101 40 718

(51) Int. Cl.
*F01M 1/00* (2006.01)

(52) U.S. Cl. ............ 184/6.26; 184/6.21; 82/1.11; 407/11

(58) Field of Classification Search ............ 82/1.11; 407/11; 184/6.26, 6.21
See application file for complete search history.

(56) References Cited

U.S. PATENT DOCUMENTS

| | | |
|---|---|---|
| 3,077,802 A | 2/1963 | Philip |
| 3,971,114 A | 7/1976 | Dudley |
| 4,829,859 A | 5/1989 | Yankoff |
| 4,919,232 A | 4/1990 | Lofton |

(Continued)

FOREIGN PATENT DOCUMENTS

DE 15509 10/1881

(Continued)

OTHER PUBLICATIONS

Kurt Häuser, "Kühlschmieren beim Zerspanen" [Cooling and lubrication during machining], Technische Rundschau No. 25, Jun. 19, 1970, pp. 21 and 23; Technische Rundschau No. 26, Jun. 26, 1970, pagers 29 and 31.

(Continued)

*Primary Examiner*—David M. Fenstermacher
(74) *Attorney, Agent, or Firm*—Greenblum & Bernstein, P.L.C.

(57) ABSTRACT

The invention relates to a method for the cutting or shaping working of metallic or ceramic workpieces and the use of a preferably submerged tool, whereby during the machining process a cooling agent, comprised at least mostly of carbon dioxide ($CO_2$), is supplied to the working position. The invention further relates to a tool for carrying out said method. According to the invention, the cooling in particular of submerges tools may be improved, whereby liquid $CO_2$ under pressure is supplied internally through the tool and released from the tool in the direct vicinity of the actual machining position, expanding through a pressure drop to atmospheric pressure, to give a cooling flow, comprising cold gas and ice particles.

20 Claims, 2 Drawing Sheets

U.S. PATENT DOCUMENTS

| | | | |
|---|---|---|---|
| 6,045,300 A * | 4/2000 | Antoun | 407/11 |
| 2005/0211029 A1* | 9/2005 | Zurecki et al. | 82/1.11 |
| 2006/0053987 A1* | 3/2006 | Ghosh et al. | 82/1.11 |
| 2006/0123801 A1* | 6/2006 | Jackson | 62/52.1 |

FOREIGN PATENT DOCUMENTS

| | | |
|---|---|---|
| DE | 1 307 808 | 8/1958 |
| DE | 1037808 | 8/1958 |
| DE | 43 26 517 A1 | 2/1995 |
| DE | 4326517 | 2/1995 |
| DE | 199 15 619 A1 | 10/2000 |
| FR | 2 724 337 A1 | 3/1996 |
| FR | 2 804 492 A1 | 8/2001 |
| GB | 781310 | 8/1957 |
| GB | 784504 | 10/1957 |
| GB | 820308 | 9/1959 |
| JP | 2000210837 | 8/2000 |

OTHER PUBLICATIONS

German Office Action issued in DE 101 40 718.1-14, dated Feb. 23, 2006.

English language translation of relevant portions of the German Office Action issued in DE 101 40 718.1-14.

* cited by examiner

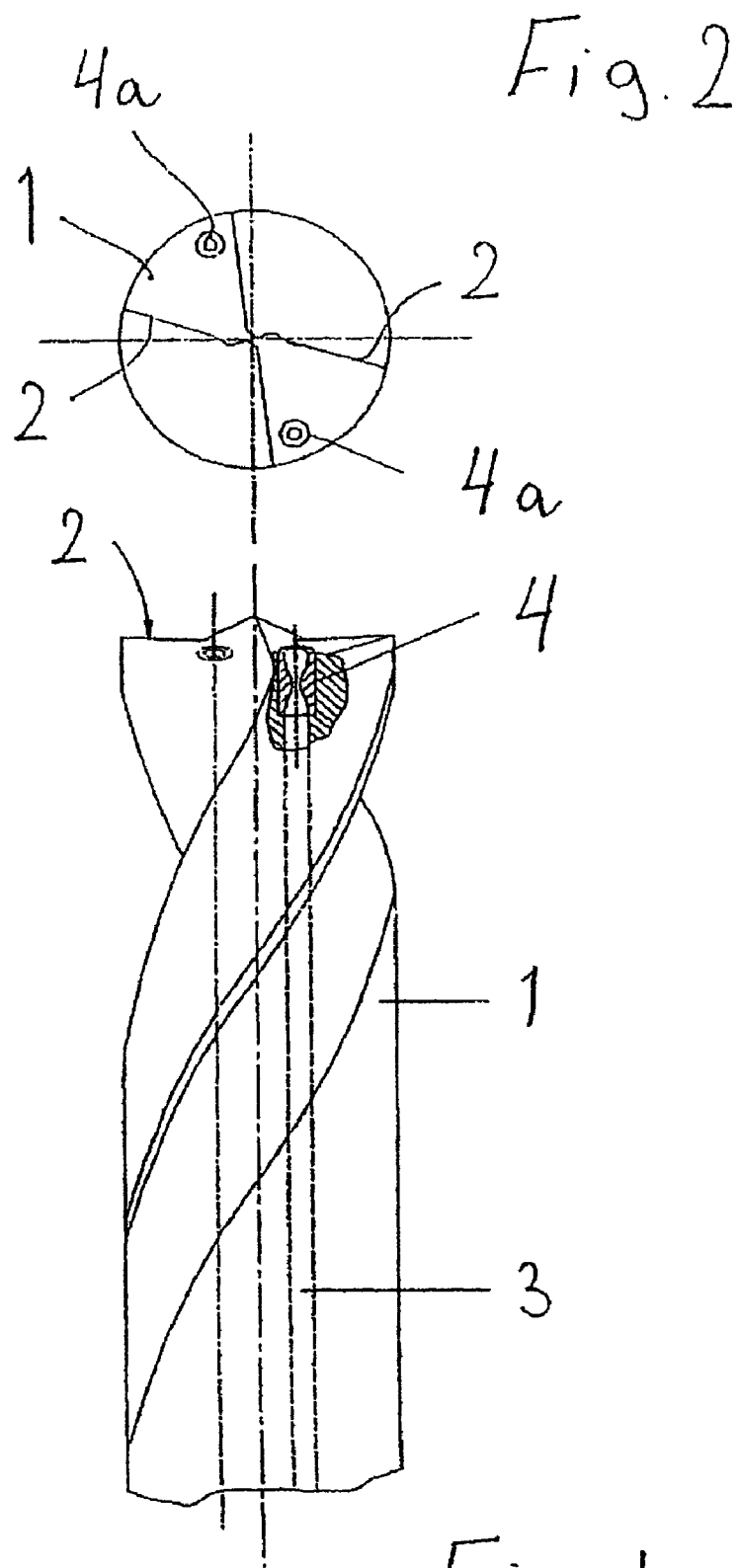

METHOD AND TOOL FOR THE MACHINING OF WORKPIECES WITH COOLING

BACKGROUND OF THE INVENTION

1. Field of the Invention

The invention relates to a method for the cutting or shaping machining of metallic or ceramic workpieces using a preferably submerged tool, in which, during the machining operation, a coolant which at least predominantly comprises carbon dioxide ($CO_2$) is fed to the machining location.

The invention also relates to a tool for carrying out the method described above.

2. Background Description

The method described in the introduction can be found in DE 43 26 517 C2. This document discloses a method for the cutting machining of metallic workpieces and also ceramic surfaces, in which, as a result of a coolant being fed to the machining location, cooling is carried out during the machining operation, and in which, for cooling purposes, a coolant jet which predominantly comprises carbon dioxide and includes cold gas and snow particles, is fed to the machining location. The coolant jet is obtained from gaseous $CO_2$ which is under a suitable superatmospheric pressure, in such a manner that the $CO_2$ gas, via a slot nozzle or other slot-like opening, is first of all expanded into an expansion volume which is formed around this expansion slot and is substantially closed off from the environment, and the cooling jet is formed starting from this expansion volume and its outlet opening and is directed onto the region which is to be cooled. In this case, the starting pressure level for the $CO_2$ prior to the expansion is at least 50 bar.

DE-B 15 509 Ib/49a has disclosed a method for the cutting machining of metallic workpieces, in which, as a result of a coolant being fed to the machining location cooling is carried out during the machining operation. The coolant used is a liquid jet of $CO_2$ directed onto the workpiece via a nozzle. The liquid jet of $CO_2$ strikes the workpiece at the machining location, forming a deposit of solid $CO_2$. The liquid $CO_2$ is intended to expand at the location where the tool touches the workpiece.

DE-AS 1 037 808 has disclosed chip-forming machining using carbonic acid in the form of snow for cooling purposes. In this case, pressurized liquid carbonic acid flows out of a capillary tube or a nozzle and as it emerges, as a result of the pressure drop, is instantaneously converted into a mixture of vapor and snow.

The cooling method based on carbon dioxide is a dry cooling method. Since at normal ambient temperature carbon dioxide adopts a gaseous state, no coolant residues remain behind on the workpiece following the cooled machining.

DE 199 15 619 A1 has described a method for discharging machining products of a machining process, in which solid $CO_2$ particles are fed to a gas stream. The gas stream together with the solid $CO_2$ particles which it has collected is then fed to a machining space, where it is directed onto a region in which a workpiece is being machined by a tool, taking in at least the majority of the machining products which are generated.

The article "Kühlschmieren beim Zerspanen" [Cooling and lubrication during machining] by Kurt Häuser (Technische Rundschau No. 25, Jun. 19, 1970, pages 21 and 23; Technische Rundschau No. 26, Jun. 26, 1970, pages 29 and 31) teaches the person skilled in the art to use $CO_2$ as cooling lubricant which is to be sprayed onto the working location as a liquid jet at a high pressure (50-70 atmosphere above atmospheric pressure), where the expansion to form a gaseous coolant takes place, so that the cooling lubricant precipitates as snow at the working location.

U.S. Pat. No. 3,971,114 refers in general terms to cryogenic coolants, in particular Freon-12 as an example of an expandable gas coolant. In this case, the coolant, which is passed through a tool, is to emerge from the tool at a small opening or bore, the intention being for this bore to control the quantity of coolant; the bore is located at a distance from the actual machining location which is such that chips cannot have any adverse effect on the emerging stream of coolant.

SUMMARY OF THE INVENTION

The invention is based on the object of improving the method described in the introduction in terms of its tool cooling and of developing a tool which is suitable for carrying out the method which has been improved in this way.

Working on the basis of the method described in the introduction, this object is achieved, according to the invention, by virtue of the fact that pressurized liquid $CO_2$ is passed internally through the tool and, in the immediate vicinity of the actual machining location, is expanded out of the tool into the machining location as a result of a pressure drop to ambient pressure, so as to form a coolant flow which contains cold gas and snow, the expansion being effected through an expansion nozzle which forms the coolant outlet from the tool.

With regard to the tool, the object of the invention is achieved by at least one internal coolant channel which is designed for the liquid $CO_2$ to pass through and opens out into an expansion nozzle for the evaporation of $CO_2$ in the vicinity of a tool cutting edge or a tool-guide strip.

The tool may, for example, be a drill, a thread-forming tool, a milling cutter, a boring bar, a reaming tool, disposable tips for lathes or the like. These may be rotating, stationary and in particular submerged tools with a geometrically defined and/or undefined cutting edge. The tools may be chip-forming tools or material-shaping tools, for example may be in the form of thread-forming tools, where material is deformed by means of impact extrusion. The cutting tools may be tools with one, two or more cutting edges. In this context, the term "tool" is also to be understood as meaning, for example, an annular nozzle which is used for dry broaching (internal broaching) and in which the broaching tool is wetted from the outside or acted on by $CO_2$ during the process.

In the case of rotating, submerged or other tools, according to the invention a spindle and/or a tool holder with an internal passage for the liquid $CO_2$ and loss-free coupling to the tool is used. The liquid $CO_2$ is then passed via a connecting line for example through a rotating spindle of a machining center to the tool without losses. Only when it emerges in the vicinity of the cutting edge via a nozzle with a very narrow cross section does the expansion take place, in the machining region. The $CO_2$ used for cooling is provided, for example, using commercially available gas cylinders and is therefore at a temperature of approximately 20° C. at a pressure of approximately 57 bar. The spindle or tool holder is therefore not affected by the expansion refrigeration.

Suitable tool holders include shrink-fit chucks, hydraulic expansion chucks or collet chucks for all drills, boring tool or threading tool shanks or for tool bodies, e.g. monobloc tools (reamers, boring bars) and tool holders for turning operations and broaching tools.

The method according to the invention is particularly suitable for submerged tools, in which the methods described in the introduction simply cannot be used or can only be used with reduced cooling efficiency. The fact that according to the invention coolant is supplied directly at the working location in this case results in a significant drop in the cutting or shaping temperature. The thermal influences can be controlled, which has positive effects on the tool service life, the cutting parameters and the workpiece quality, in particular in terms of dimensionsal accuracy and surface quality.

It is expedient if the coolant flow is only actuated by means of a $CO_2$-resistant solenoid valve during the working time. In this case, it is advantageous if the expansion nozzle and/or its associated coolant channel is/are dimensioned in such a way that only the quantity of liquid $CO_2$ which is required for sufficient cooling per unit time is expanded.

Use of the invention makes it possible to eliminate the problems which have hitherto occurred with what is known as dry machining (contamination of the machine; thermal problems, in particular where tight gauge tolerances are important). It has been possible to demonstrate by tests that when the method according to the invention is used, it is possible to maintain a constant temperature at the tool and workpiece. Consequently, when the cooling of the invention is employed, it is possible for production lines to run completely dry, even where it is necessary to achieve high levels of manufacturing accuracy.

Once it has been possible to establish by extensive and intensive tests that, at particularly high machining speeds and advance rates, in particular when machining Si-containing aluminum alloys, it is not possible to dispense with residual lubrication, according to the invention in such cases it is proposed to add a low-viscosity lubricant, e.g. a low-viscosity oil, to the liquid $CO_2$, in which case the inoculation with the lubricant can be performed in the form of a continuous feed just before the liquid $CO_2$ stream is introduced into the tool. In this case, intensive mixing is expedient, which according to the invention can be guaranteed by passing the $CO_2$/lubricant mixture through a small sintered plate.

The liquid $CO_2$ stream fed to the tool may be at a pressure of approximately 55-63 bar and a temperature of approximately 18-25° C. The mixing ratio of liquid $CO_2$ to liquid lubricant may, for example, be set to approximately 30:1.

In terms of the configuration of the tool, it is advantageous if the outlet opening of the expansion nozzle lies at a short distance ahead of the tool outlet, allowing the tool cutting edge or tool-guide strip to be reground or sharpened.

As an alternative, it is also possible for the outlet opening of the expansion nozzle to lie behind the tool cutting edge or in the chip space.

Furthermore, it may be expedient if the $CO_2$ expansion nozzle is integrated in a compressed-air nozzle, which has a lubricant feed opening out into its compressed-air jacket which forms during operation. In this case, the lubricant is then admixed with the compressed-air jacket which forms around the $CO_2$ expansion jet, in which case the lubricant quantity could be controlled independently of the demand for cooling from the $CO_2$. However, a solution of this nature is only suitable for relatively large tools.

If permitted by the type of tool production it is expedient for the expansion nozzle to be worked, for example sintered, into the tool during production of the tool. If the tool is itself produced by machining, as is the case with boring bars, for example, the expansion nozzle may be installed from the outside or may itself be produced by chip-forming machining or may be introduced into the tool by erosion.

BRIEF DESCRIPTION OF THE DRAWINGS

The drawing diagrammatically depicts an embodiment of the invention which serves as an example. In the drawing:

FIG. 1 shows a side view of a twist drill, partly in longitudinal section,

FIG. 2 shows a plan view of the twist drill illustrated in FIG. 1, and

DETAILED DESCRIPTION OF EMBODIMENTS OF THE INVENTION

Figure 3:
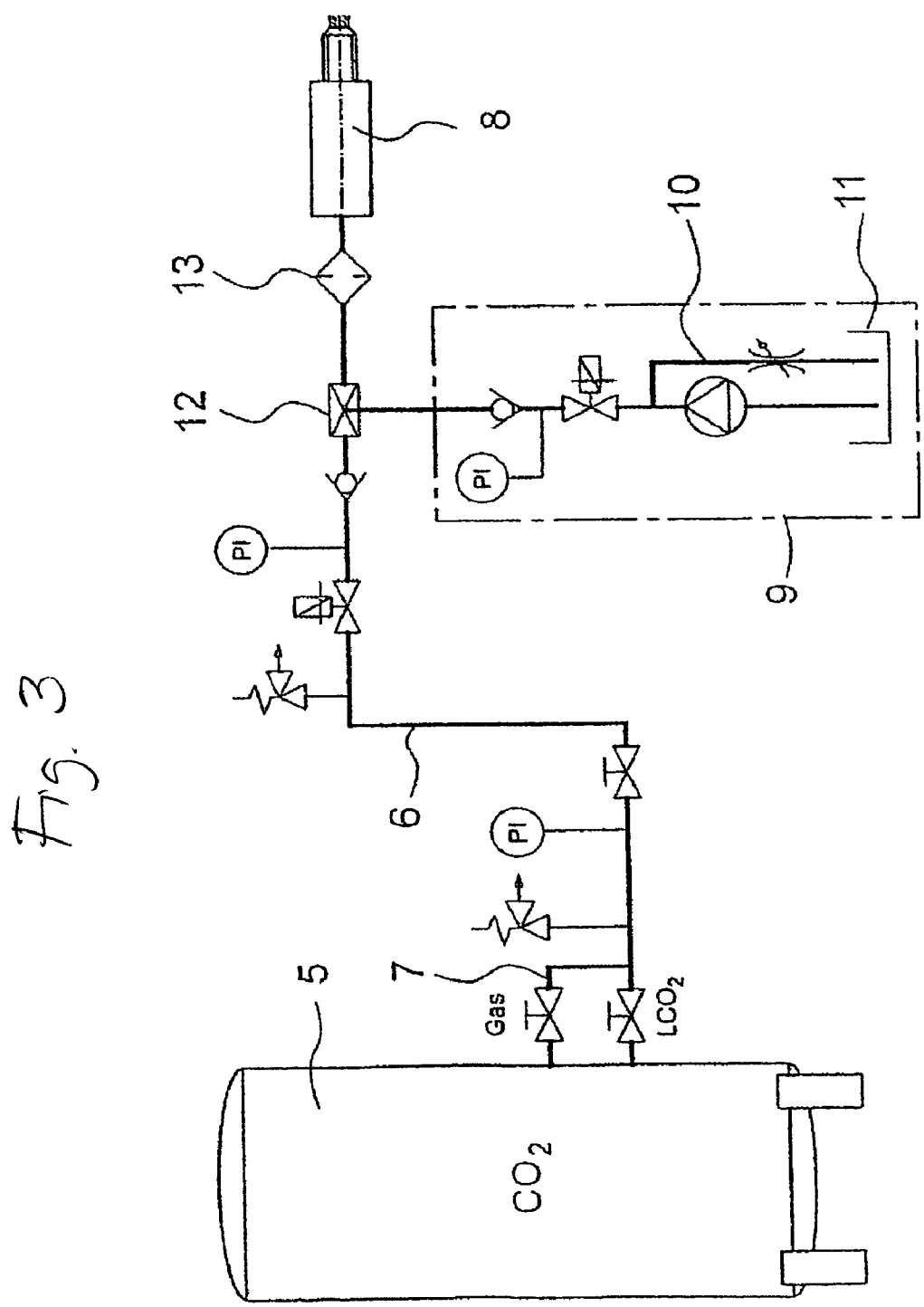
FIG. 3 shows a flow diagram for the $CO_2$ lubricant inoculation.

The figures illustrate a tool 1 in the form of a twist drill with two tool cutting edges 2. Two coolant channels 3 which are designed for liquid $CO_2$ to pass through lead through the tool 1 and, in the vicinity of the associated tool cutting edge 2, in each case open out into an expansion nozzle 4 to evaporate the $CO_2$. The outlet opening 4a of each expansion nozzle 4 lies at a short distance ahead of the tool outlet for the evaporated $CO_2$, allowing the tool cutting edge 2 to be reground or sharpened.

FIG. 3 shows an exemplary embodiment of the way in which a liquid lubricant is fed into the $CO_2$ stream before entering the tool.

From a $CO_2$ tank 5, the liquid $CO_2$, which may, for example, be at a temperature of 20° C. and a pressure of 57 bar, is introduced into a tool 1 via a $CO_2$ line 6, to which a gas line 7 is also connected, and a rotary passage 8. An installation 9 for inoculating this $CO_2$ stream with a liquid lubricant is diagrammatically depicted by dot-dashed lines. This installation comprises a hydraulic pump 10 which is equipped with a bypass and feeds lubricant out of a lubricant tank 11 via a needle valve 12 into the $CO_2$ line 6 at a pressure which at least corresponds to the $CO_2$ pressure in the $CO_2$ line 6. Downstream of this needle valve 12, as seen in the direction of flow, a small sintered plate 13 is connected into the $CO_2$ line 6; the $CO_2$/lubricant mixture flows through this small sintered plate 13, producing intensive mixing of the two mixture components.

The invention claimed is:

1. A method for machining workpieces using a submerged tool, in which, during a machining operation, a coolant which at least predominantly comprises:
   directing carbon dioxide ($CO_2$) to the machining location,
   passing pressurized liquid $CO_2$ internally through the tool, and
   expanding the pressurized liquid $CO_2$ in the immediate vicinity of the machining location out of the tool into the machining location as a result of a pressure drop to ambient pressure, so as to form a coolant flow which contains cold gas and snow, the expanding being effected in the tool through an expansion nozzle which forms the coolant outlet from the tool.

2. The method as claimed in claim 1, further comprising using at least one of a spindle and a tool holder with an internal passage for the liquid $CO_2$ and loss-free coupling to the tool.

3. The method as claimed in claim 1, further comprising actuating the coolant flow only by means of a $CO_2$-resistant solenoid valve during a working time.

4. The method as claimed in claim 1, wherein at least one of the expansion nozzle and its associated coolant channel are dimensioned in such a way that only the quantity of liquid $CO_2$ which is required for sufficient cooling per unit time is expanded.

5. The method as claimed in claim 1, further comprising adding a low-viscosity lubricant to the liquid $CO_2$.

6. The method as claimed in claim 5, wherein the lubricant used is a low-viscosity oil.

7. The method as claimed in claim 5, wherein the lubricant is added to the liquid $CO_2$ stream continuously before the latter is introduced into the tool.

8. The method as claimed in claim 5, further comprising feeding the lubricant into the liquid $CO_2$ via a needle valve at a pressure which at least corresponds to the $CO_2$ pressure.

9. The method as claimed in claim 5, wherein after the lubricant has been fed into the liquid $CO_2$, the $CO_2$/lubricant mixture is subjected to intensive mixing.

10. The method as claimed in claim 9, wherein the $CO_2$/lubricant mixture is passed through a small sintered plate in order for it to be intensively mixed.

11. The method as claimed in claim 1, wherein a liquid $CO_2$ stream fed to the tool is at a pressure of approximately 55-63 bar and a temperature of approximately 18° C.-25° C.

12. The method as claimed in claim 5, wherein a mixing ratio of liquid $CO_2$ to liquid lubricant is set to approximately 30:1.

13. The method as claimed in claim 1, further comprising adding lubricating granules to the liquid $CO_2$.

14. A tool for carrying out the method as claimed in claim 1 comprising at least one internal coolant channel which is designed for the liquid $CO_2$ to pass through and, in the vicinity of a tool cutting edge or a tool-guide strip, opens out into an expansion nozzle to evaporate the $CO_2$.

15. The tool as claimed in claim 14, wherein an outlet opening of the expansion nozzle lies at a short distance ahead of the tool outlet, allowing the tool cutting edge or tool-guide strip to be reground or sharpened.

16. The tool as claimed in claim 14, wherein an outlet opening of the expansion nozzle lies behind the tool cutting edge or in the chip space.

17. The tool as claimed in claim 14, wherein the expansion nozzle is worked, into the tool during production of the tool.

18. The tool as claimed in claim 14, wherein the expansion nozzle is integrated in a compressed-air nozzle, which has a lubricant feed opening out into its compressed-air jacket which forms during operation.

19. The tool as claimed in claim 14, wherein the expansion nozzle is sintered into the tool during production of the tool.

20. The method as claimed in claim 1, wherein the expansion begins in the tool through the expansion nozzle incorporated into the tool.

* * * * *